United States Patent [19]

Unger

[11] Patent Number: 4,669,751
[45] Date of Patent: Jun. 2, 1987

[54] TENSION ELIMINATOR FOR A VEHICLE SAFETY BELT RETRACTOR

[75] Inventor: Hans Unger, Sylmar, Calif.

[73] Assignee: American Safety Equipment Corporation, Troy, Mich.

[21] Appl. No.: 822,065

[22] Filed: Jan. 24, 1986

[51] Int. Cl.$^4$ .............................................. B60R 22/34
[52] U.S. Cl. .................................... 280/807; 180/268; 242/107
[58] Field of Search ................ 180/268; 280/801, 806, 280/807, 808; 242/107, 107.4, 107.7, 107.6

[56] References Cited

U.S. PATENT DOCUMENTS

| | | | |
|---|---|---|---|
| 3,834,646 | 9/1974 | Heath | 242/107.7 |
| 3,880,364 | 4/1975 | Andres | 242/107.4 |
| 3,957,222 | 5/1976 | Bladh | 242/107 |
| 3,957,283 | 5/1976 | Pocobello | 297/475 |
| 3,976,257 | 8/1976 | Fohl | 242/107 |
| 3,984,063 | 10/1976 | Knieriemen | 242/107 |
| 3,997,126 | 12/1976 | Karlsson | 242/107 |
| 4,002,311 | 1/1977 | Fisher | 242/107.7 |
| 4,026,494 | 5/1977 | Tanaka | 242/107 |
| 4,108,393 | 8/1978 | Henderson | 242/107 |
| 4,113,200 | 9/1978 | Tanaka | 242/107 |
| 4,293,107 | 10/1981 | Ziv | 242/107.7 |
| 4,461,493 | 7/1984 | Doty | 280/807 |
| 4,492,348 | 1/1985 | Ziv et al. | 280/807 |
| 4,494,709 | 1/1985 | Takada | 280/807 |
| 4,519,652 | 5/1985 | Kamijo | 280/807 |
| 4,529,143 | 7/1985 | Kanada et al. | 280/807 |
| 4,570,872 | 2/1986 | Tsujimura et al. | 280/807 |
| 4,588,144 | 5/1986 | Nishimura | 280/807 |
| 4,598,932 | 7/1986 | Compeau et al. | 280/807 |
| 4,600,164 | 7/1986 | Ty et al. | 280/807 |

*Primary Examiner*—Richard A. Bertsch
*Attorney, Agent, or Firm*—Poms, Smith, Lande & Rose

[57] ABSTRACT

A safety belt retractor mechanism for vehicle passengers is described which has an apparatus for selectively relieving belt retractive tension on the passenger. The apparatus may be either manually or automatically engaged at a first extensive position of the belt corresponding to the buckled up position such that, for a single extractive movement of the belt by a first predetermined amount of "slack", the belt is locked against further retractive movement below that position, thereby relieving the retractive tension of the belt on the wearer. Further extensive and retractive movements of the belt beyond the tensionless position and less than a second predetermined amount, such as would result from passenger forward movements to reach controls, etc., result in normal retractive tension in the belt against the passenger until the passenger returns to the buckled up position. The apparatus then "remembers" this position and restores the slack to the wearer. Upon extractive movements of the belt greater than the second predetermined amount, or upon manual or automatic disengagement of the tensionless mode, the retractive tension of the belt below the slack position is restored until again reset by the passenger.

The apparatus is distinctive in its use of a Geneva mechanism to drive a memory disk having a pair of cams on its surface at a reduced rate through a frictional clutch to operate a locking pawl cooperating with a ratchet disk attached to the spool of the belt retractor to lock and unlock the spool at the appropriate positions. A control arm indexes the memory disk relative to the locking positions and the Geneva mechanism permits significantly increased extensive movements of the passenger beyond the slack position without unlocking the mechanism, as well as increased accuracy of control over the belt slack and unlocking positions.

20 Claims, 17 Drawing Figures

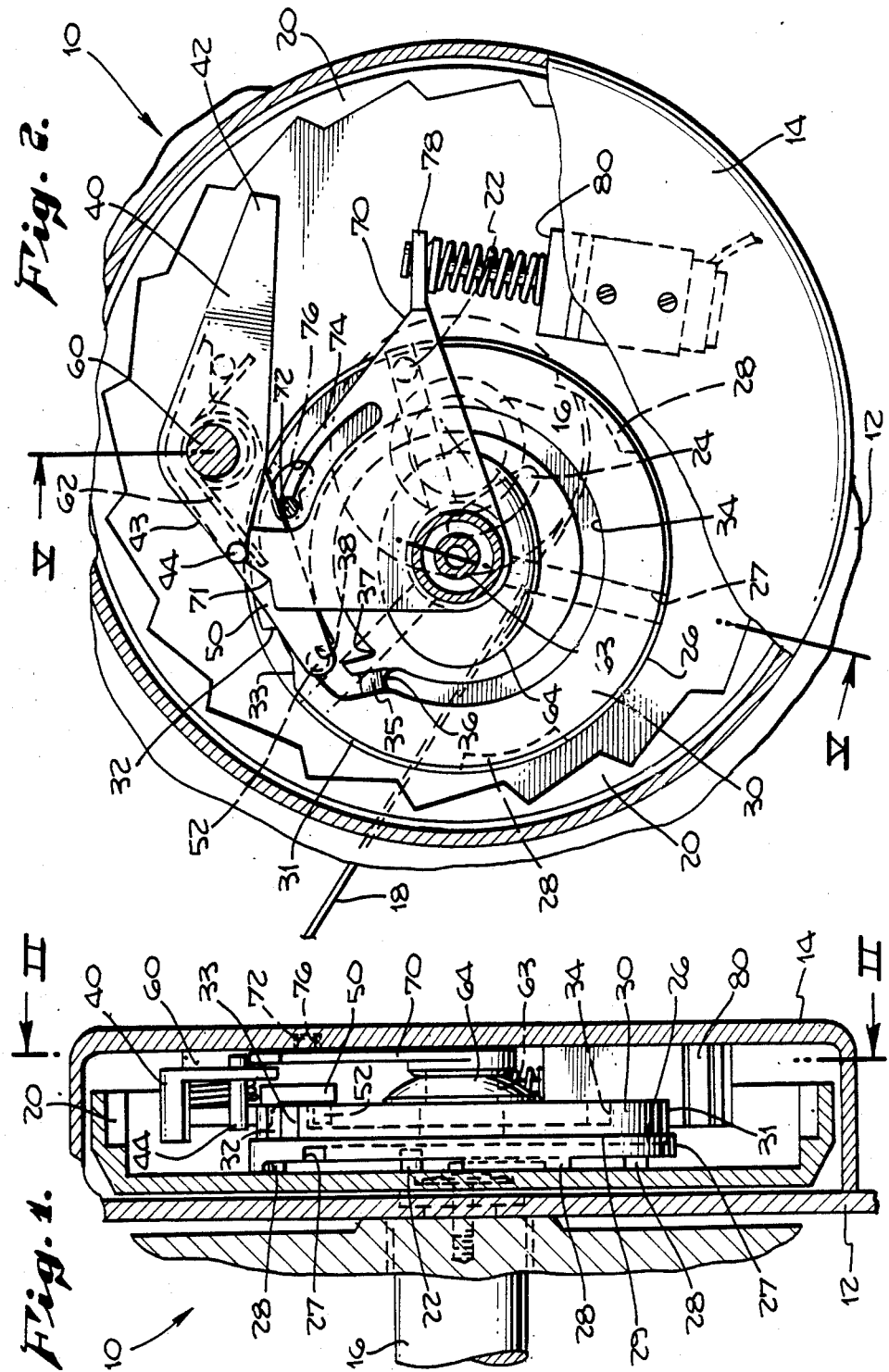

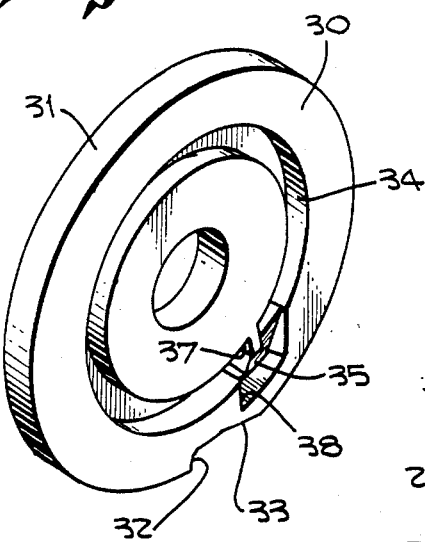
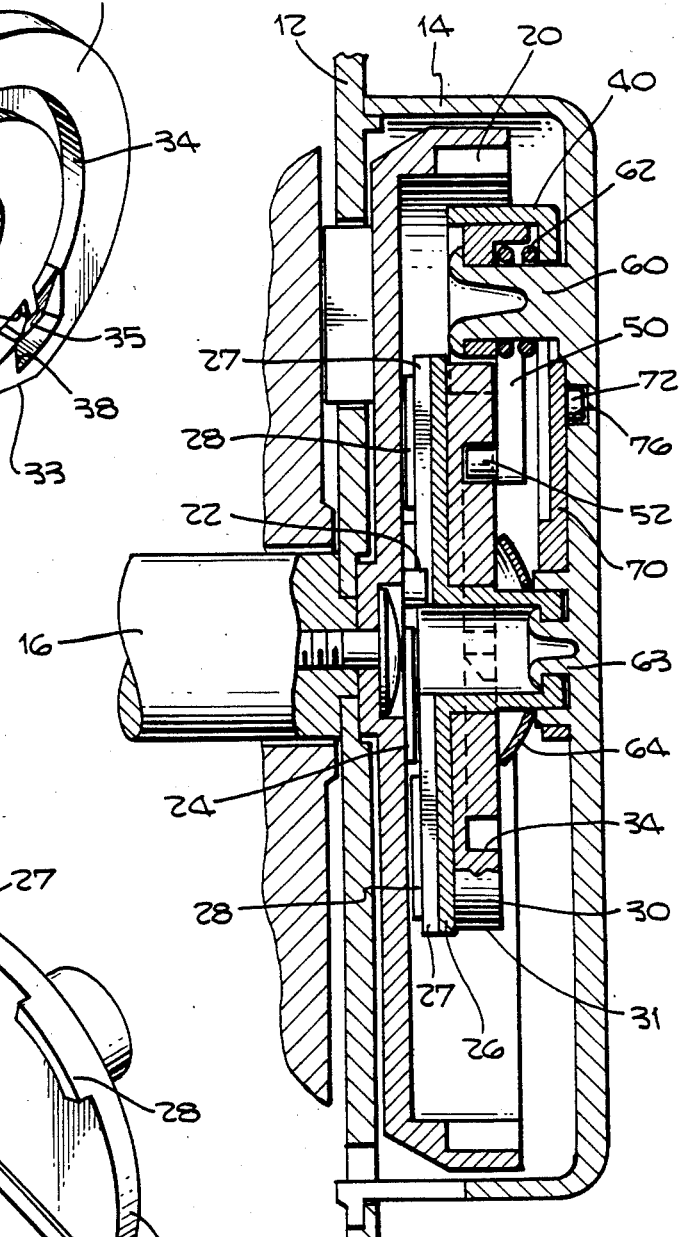
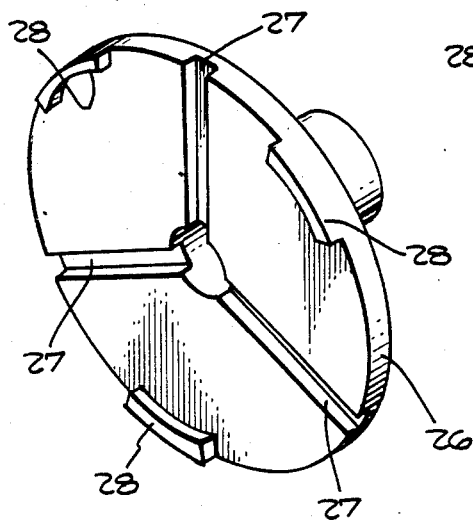

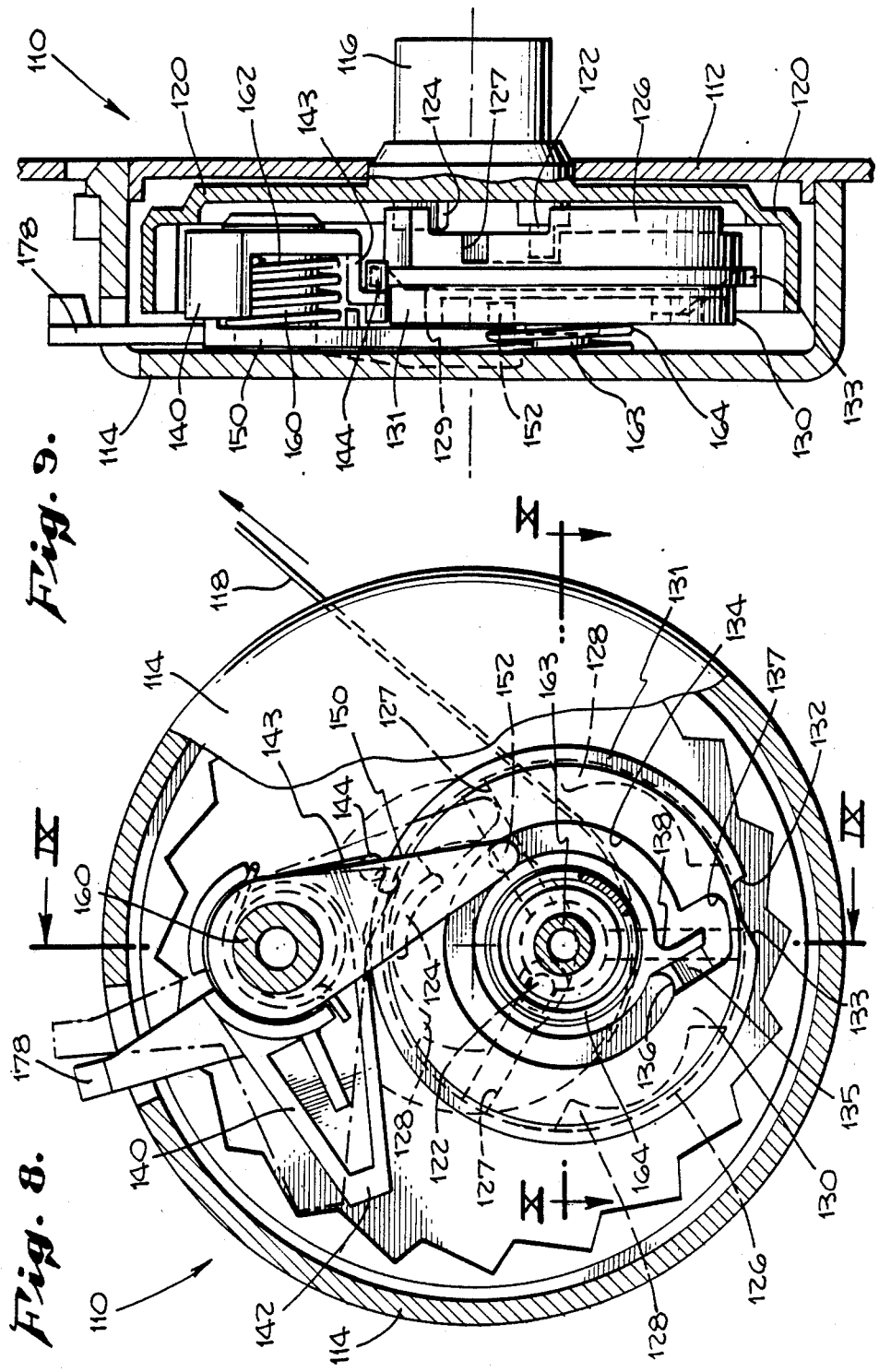

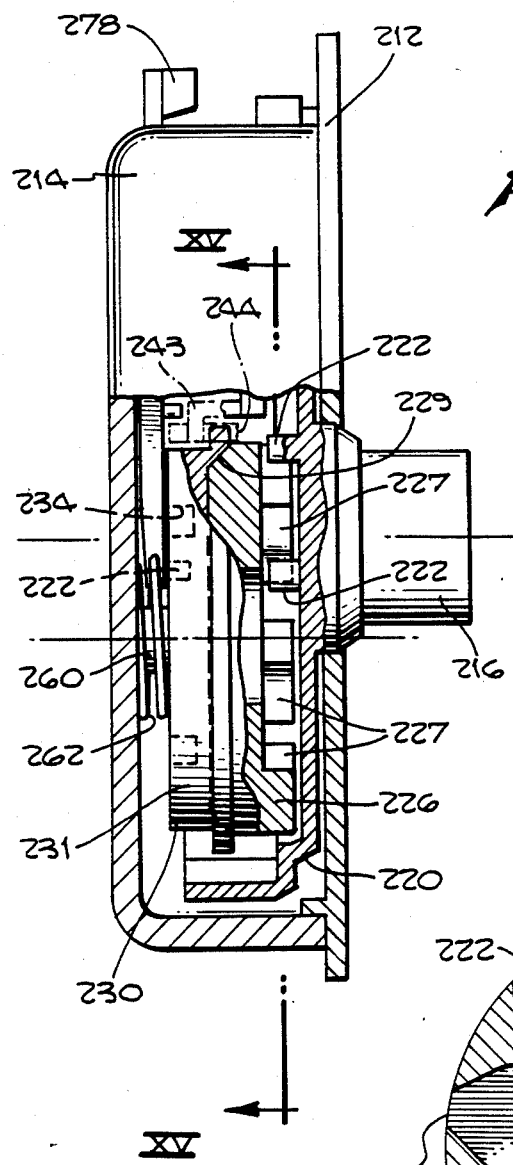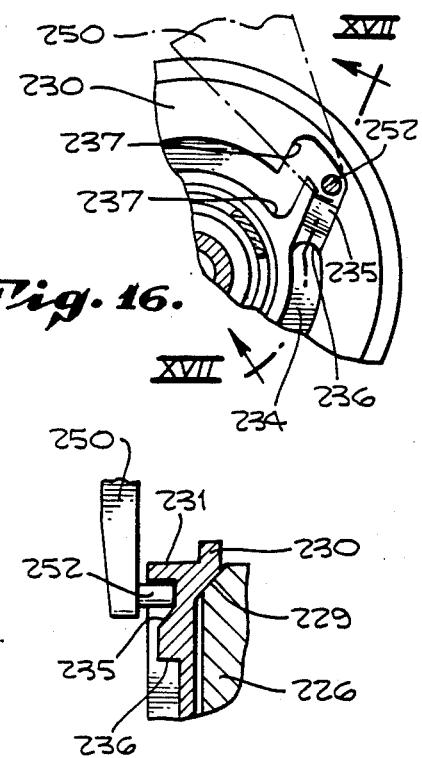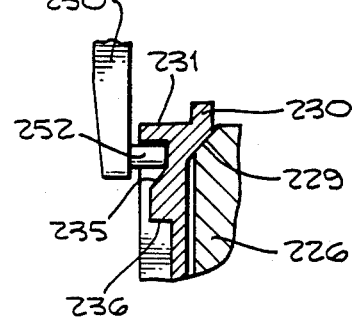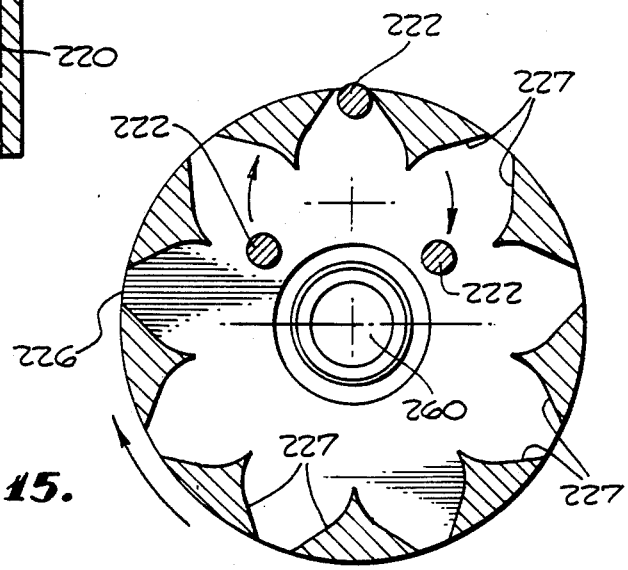

TENSION ELIMINATOR FOR A VEHICLE SAFETY BELT RETRACTOR

BACKGROUND OF THE INVENTION

1. Field of the Invention

This invention relates generally to vehicular seat belt retracting mechanisms, and more specifically, to an apparatus for selectively eliminating the retractive tension of the belt upon the wearer.

2. Prior Art

The last decade has seen the universal provision in almost all passenger vehicles of safety belt mechanisms to restrain the passengers safely within the vehicle during emergency conditions, such as collisions or sudden stops.

Typically, these belt systems are provided with a flexible safety belt which extends across the lap and chest of the wearer and interconnects with the frame of the vehicle, usually with a quick-disconnect buckle, to restrain the passenger in a "buckled-up" position, i.e., seated comfortably in a vehicle seat and reclining against a backrest.

Usually, the belts are retained on a spool rotatably-attached to the frame of the vehicle and continuously biased in a belt-retractive direction by means of a coil spring, such that, when the belt is unbuckled, the belt withdraws to a fully-retracted position and out of the way of the passenger. Additionally, it may be provided that the extensive end of the belt be attached to, for example, the door of the automobile, such that the step of opening the door extends the belt out of the way of the passenger for entry into the vehicle, and the step of closing the door permits the belt to retract to its retentive position about the wearer.

Typically, the retractor mechanism is provided with a means for sensing accelerations of the vehicle and/or accelerations in the belt of a level occuring during emergency conditions and for locking the spool against further extensive movement, thereby preventing further extensive movement of the belt and restraining the passenger during the occurrence of the emergency.

Devices for relieving retractive tension in vehicle safety belt mechanisms are known in the art.

U.S. Pat. No. 3,834,646 to Heath describes a retractor mechanism that includes a vehicle sensitive inertial lock-up and an automatic tension-relieving mechanism. The mechanism utilizes a pawl that rides on the edge of a pair of cam disks rotated by a retractor spool and arranged such that the pawl will fall into engagement with the spool ratchet surface upon a sequence of belt extension, retraction, and a subsequent predetermined extension. This sequence of belt manipulation automatically initiates the tension-relieving mode and automatically resumes the tension mode upon subsequent extension.

U.S. Pat. No. 4,200,311 to Fisher teaches another form of automatic tension-relieving mechanism that includes a memory by utilizing a pawl engagable with a disk attached to the retractor spool and having multiple groove tracks. Upon substantial extensive movement of the spool, followed by retraction, a pawl is engaged in a multiple track engagement, whereby subsequent extension will cause the pawl to engage and be retained by multiple ratchet teeth corresponding with desirable amounts of belt slack and preventing subsequent retraction of the belt beyond the point of engagement. The tracks are spiral grooved but allow a moderate amount of belt extension without the pawl becoming disengaged from the groove, such that upon retraction, the pawl will retrace its outwardly-spiraling path and will become re-engaged with the ratchet teeth and with substantially the same amount of slack, thus having memory.

U.S. Pat. No. 4,293,107 to Ziv discloses a retractor spool having one of a pair of mutually engaging ratchet disks fixedly mounted thereto, the second being carried by an extended length portion of the spool shaft such that it is laterally slidable along the shaft into and out of engagement with the first disk. An orienting spring biases the second disk to engagement with the first disk and rotationally re-orients the second disk into a predetermined initial condition upon disengagement from the first disk. Disengagement is accomplished by a lifting plate that interconnects with the collar and sleeve portion of the second ratchet disk to lift it out of engagement. Integral with the second ratchet disk is a memory disk having an open outwardly-spiraling groove that interacts with a tension-relieving pawl and an orienting pawl. The tension-relieving pawl is biased to track the radially inward wall of the groove and is engageable with multiple tension-relieving teeth carried by the inward wall of the groove to prevent retractive rotation of the spool. The tension relieving pawl is also lifted by a lifting plate such that the pawl springs radially inward against an orienting stop so that the pawl will reengage the disk groove in a predetermined orientation. A lever communicates with the lifting plate to cause the mechanism to be engaged or disengaged from the retractor spool. A latch is provided to retain the actuator lever in the engaged position until either manual override or extension of the belt beyond the predetermined maximum amount causes the tension relieving pawl to cause an extended length disengaging arm of the latch to unlatch the actuator lever.

One of the problems encountered with the prior art tension-relieving mechanisms is that of the increased number of frictional surfaces associated with the mechanisms, which result in an increased drag on the spool in the retractive direction, and hence, larger retractor springs and forces, as well as an increased complexity and cost related to control over the finish on the frictional surfaces, the degree of lubrication required, and wear.

Another problem with the prior art mechanisms is that they provide only a limited amount of "freedom" in movement of the wearer beyond the "slack" position before unlocking the reel to a retractive movement below the memory position. Typically, this occurs after only one or two revolutions of the spool at most, which translates into only a few millimeters of freedom of movement to the wearer through which the mechanism can "remember" the slack position.

It would be desirable, therefore, to provide a tension-relieving apparatus for a safety belt retractor mechanism which is also relatively frictionless, which is relatively inexpensive and simple to fabricate and assemble, yet which is reliable in operation, and which permits a greater amount of extensive movement of the belt above the slack position before unclocking the apparatus from the tensionless mode.

SUMMARY OF THE INVENTION

It is therefore an object of the present invention to provide an apparatus for relieving the retractive tension in a safety belt retractor mechanism which offers a minimal degree of frictional resistance to extractive and retractive movement of the belt.

It is another object of the present invention to provide such a tension eliminator in an embodiment that is inexpensive and simple to fabricate, assemble and use, yet which is safe and reliable in demanding use.

It is yet another object of the present invention to provide such a mechanism as will permit large, predetermined amounts of passenger movement within the vehicle during the tensionless mode and beyond the slack position without causing the mechanism to become disengaged from the tensionless mode.

These and other objects and advantages are preferably accomplished in a tension eliminator having a ratchet disk fixed to the spool of the retractor for rotation therewith, the ratchet disk driving a memory disk at a reduced rate by means of a Geneva mechanism coupled to the memory disk through a single, frictional clutch, the memory disk cooperating during rotation with a pivotally-mounted locking pawl to engage and disengage the ratchet wheel at the slack position, and to disengage it otherwise, the memory disk further cooperating with a control arm pivotally attached to the apparatus to index the memory disk at an appropriate angular position relative to the locking, or slack, position, such that the apparatus "remembers" the slack position and permits a substantial amount of extensive movement of the belt beyond it before unlocking the spool against retractive movement below the slack position. An actuator is provided which permits selective engagement or disengagement of the apparatus into or out of a tensionless mode, the actuator being either manually operated by the wearer or automatically actuated or deactivated by external stimuli, such as, for example, the step of buckling or unbuckling the belt.

A more complete understanding of the invention may be obtained from a consideration of the following detailed description of the preferred embodiments, when taken in conjunction with a perusal of the attached drawings, of which the following is a brief description.

BRIEF DESCRIPTION OF THE DRAWINGS

FIG. 1 is a sectional view through the side of a first preferred embodiment of the present invention;

FIG. 2 is a partial sectional view through the end of the first preferred embodiment as revealed by the section II—II taken in FIG. 1, with the apparatus in the tensioned mode;

FIG. 5 is a sectional view through the first embodiment, as revealed by the section V—V taken in FIG. 2;

FIG. 6 is a perspective view of the double cam, or memory disk, of the first embodiment;

FIG. 7 is a perspective of the underside of the drive disk of the first embodiment, showing the Geneva mechanism component formed therein;

FIG. 8 is a partial sectional view into the end of a second preferred embodiment of the present invention;

FIG. 9 is a sectional view through the side of the second preferred embodiment, as revealed by the section IX—IX taken in FIG. 8;

FIG. 14 is a partial sectional view through the side of the memory disk and driver disk of the second preferred embodiment illustrating a second possible modification of the Geneva drive mechanism;

FIG. 15 is a sectional view of the underside of the Geneva drive mechanism of the second modification to the second preferred embodiment, as revealed by the section XV—XV taken in FIG. 14;

FIG. 16 is a view into the end of the memory disk of the second embodiment, illustrating an inclined ramp and ledge located in the groove of the memory disk;

FIG. 17 is a partial sectional view through the side of the inclined ramp and ledge of the memory disk, as revealed by the section XVII—XVII taken in FIG. 16.

DESCRIPTION OF THE PREFERRED EMBODIMENTS

Figure 3:
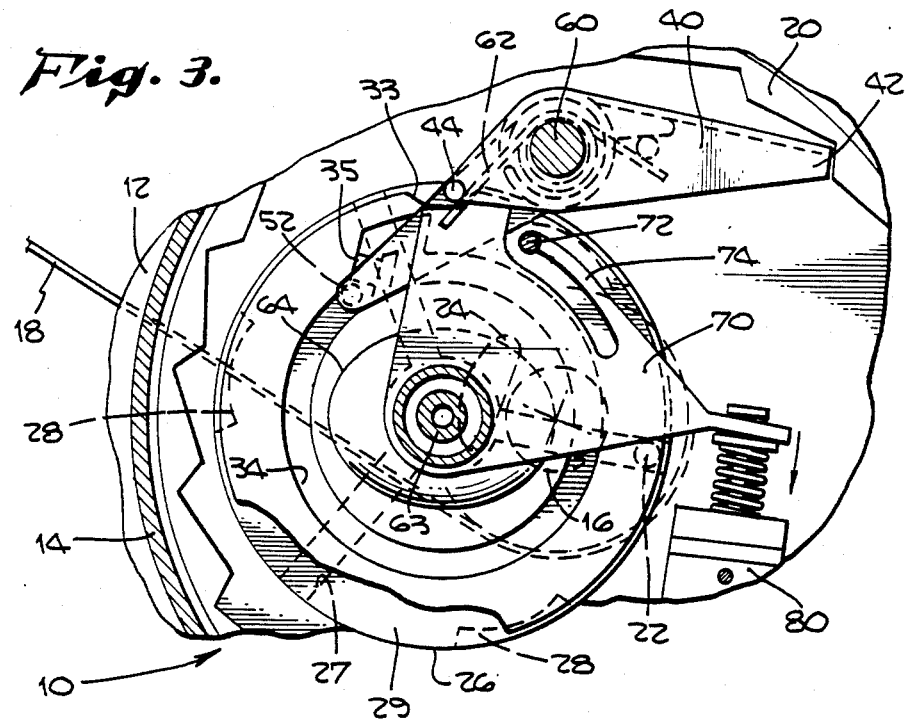
FIG. 3 is another partial sectional end view of the apparatus of the first embodiment shown engaged in the tensionless mode.

FIGS. 1 through 7 illustrate a first preferred embodiment of the present invention, a tension eliminator for a safety belt retractor mechanism 10.

An apparatus in accordance with the first preferred embodiment comprises a frame 12 rigidly attached to the vehicle, including a cover part 14 attached thereto, and a takeup reel or spool 16 rotatably-journalled within frame 12 and biased in a retractive direction to wind a flexible safety belt 18 thereon toward a fully-retracted position.

Fixed to take-up reel 16 is a ratchet disk 20 having plurality of teeth therein for engagement with a locking pawl 40 to lock spool 16, and hence, belt 18, against retractive movement. Ratchet disk 20 also is utilized to drive the memory and locking components of the apparatus at a reduced rate by means of the incorporation of a Geneva mechanism of a type which is known in the art. Thus, in the first embodiment, ratchet disk 20 has, upon its outward-facing surface, a drive pin 22 and kidney-shaped indexing pin 24 to engage with a complementary Geneva pattern on the underside of driver disk 26, including a plurality of drive slots 27 and indexing blocks 28 (see FIG. 7). In the first preferred embodiment illustrated, a single drive pin 22 is located eccentrically on ratchet disk 20 and serves to engage and drive three driver slots 27 on the underside of drive disk 27 consecutively, intermittently, and at a reduced rate of 3-to-1, i.e., three revolutions of spool 16 result in one complete revolution of driver disk 26. Similarly, indexing pin 24 is disposed 180° away from drive pin 22 and meshes with guide blocks 28 to prevent rotational movement of driver disk 26 during the intermittant periods when drive pin 22 is disengaged from drive slots 27.

Although a Geneva mechanism has been illustrated in the first preferred embodiment, skilled practitioners will recognize that the driving means between ratchet disk 20 and driver disk 26 could be modified to achieve the desired ratio by the use of conventional gears in a gear train between these two elements, to achieve a similar reduction.

A frictional clutch 29, created by the forceful interface of the outer face of driver disk 26 and the inner face of a memory disk 30 provides for co-rotation of memory disk 30 with driver disk 26, except when memory disk 30 is locked in either the extractive or retractive direction, in which case relative slipping between these two elements occurs. This permits memory disk 30 to be appropriately indexed relative to locking pawl 40 in response to movement of spool 16.

In the first preferred embodiment, memory disk 30 has a circular radial periphery 31 which contains a locking detent 32 at a given angular position along the periphery, followed by an inclined plane feature 33. Additionally, memory disk 30 contains on its outer face a closed, circumferential groove 34 having a short, radially-outer portion and a long, radially-inner portion, which are connected at their ends by short, radially-oriented transition sections. At the bottom of groove 34, within the first of these short transition sections is disposed an inclined ramp 35 which inclines upward from the bottom of groove 34 and is followed by a right-angled ledge 36 which drops back to the floor or bottom of circular groove 34. At the end of the long, inner portion of groove 34, the second transition section includes a radially-inner notch 37, followed by a radially-outer shoulder 38, which serves to close groove 34.

In the first preferred embodiment, a locking pawl 40, having a locking tooth 42, is mounted pivotally to cover 14 and serves to engage and disengage ratchet disk 20 for locking and unlocking of ratchet disk 20, and hence spool 16, against retractive movement. Locking pawl 40 further includes a follower arm 43 having a nose part 44 disposed to ride on the outer periphery 31 of memory disk 30 during rotation. However, at one particular angular displacement of memory disk 30 relative to pawl nose part 44, nose part 44 will fall into detent 32, which permits locking tooth 42 of pawl 40 to engage ratchet disk 20 to lock spool 16 against retractive movement. Further extensive movement of memory disk 30 will cause inclined ramp 33 to engage nose part 44 to lift locking pawl 40 out of engagement with ratchet disk 20, thus freeing spool 16 for extractive and retractive movement.

Figure 4:
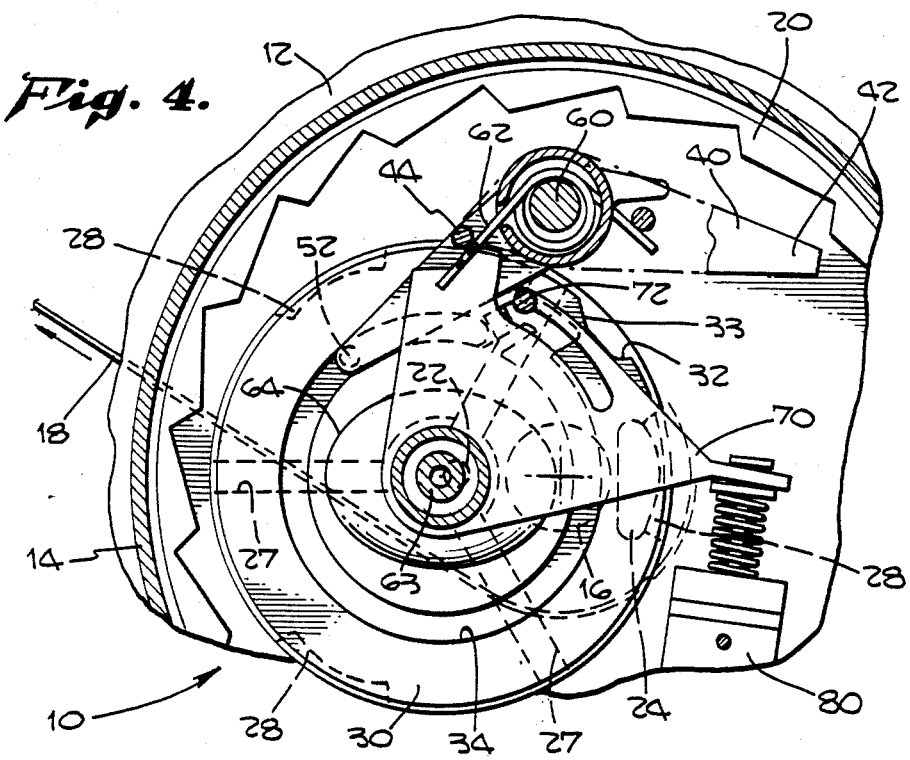
FIG. 4 is yet another sectional view through the end of the first embodiment, showing the belt having been moved a distance in the extensive direction (as indicated by the arrow) beyond the tensionless, or slack position.
Figure 10:
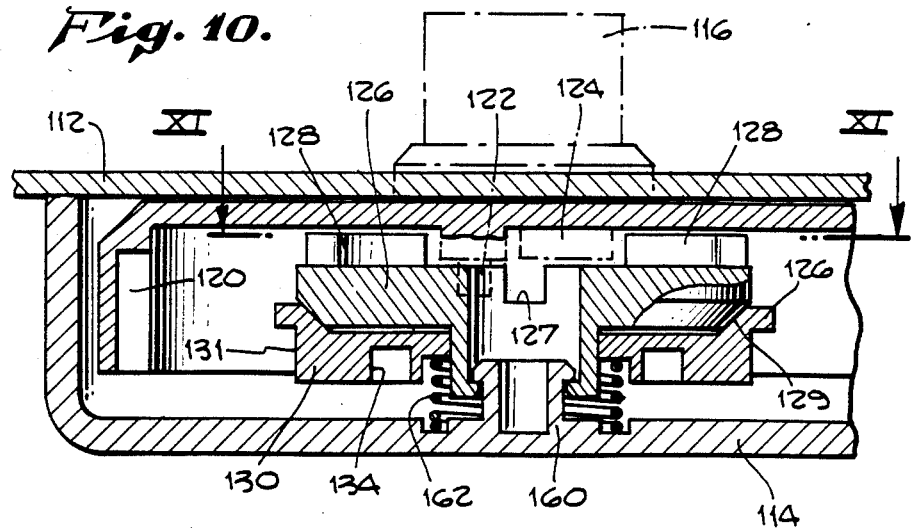
FIG. 10 is a partial sectional view through the side of the second embodiment, as revealed by the section X—X taken in FIG. 8, illustrating the components of the memory disk and memory disk driving mechanism.
Figure 11:
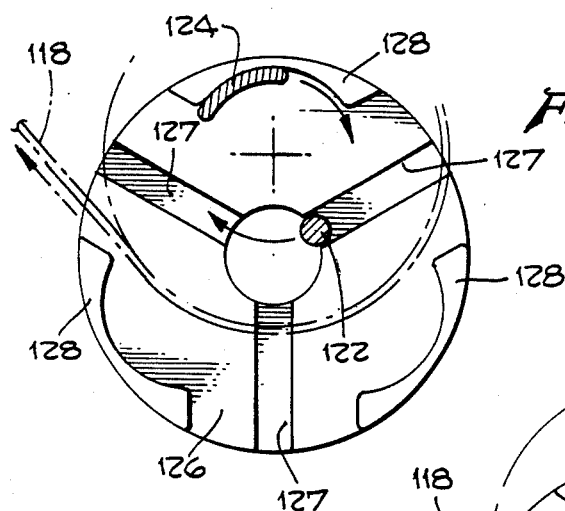
FIG. 11 is a view into the other side of the driver disk of the second preferred embodiment, as revealed by Section XI—XI, taken in FIG. 10, in which the extractive direction of the belt is indicated by a straight arrow and the rotational movement of the drive pin and index pin on the locking disk is shown by a pair of curved arrows during extractive movement of the belt during operation of the Geneva mechanism drive.
Figure 12:
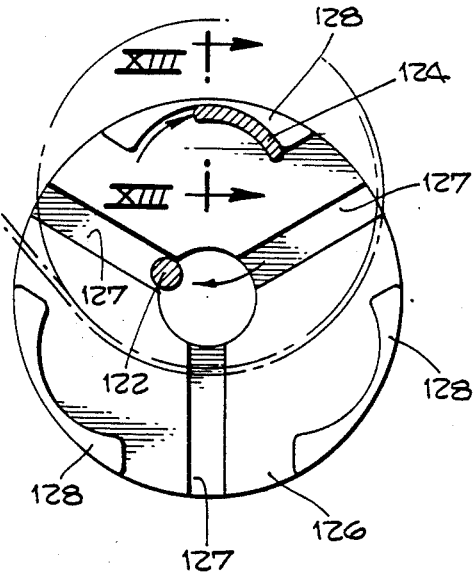
FIG. 12 is similar to FIG. 11, showing the pin of the Geneva drive having been rotated through an extractive angle prepatory to entering a second drive groove.
Figure 13:
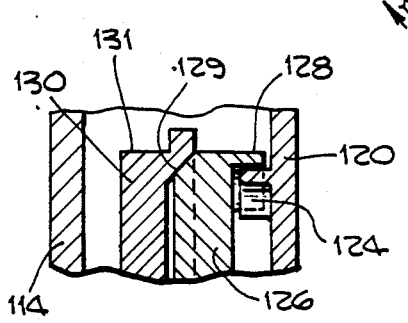
FIG. 13 is a partial sectional view through the side of the driver disk and memory disk of either embodiment, as revealed by the section XIII—XIII taken in FIG. 12, illustrating a possible modification of the frictional interface between the driver disk and the memory disk of either preferred embodiment.

A control arm 50 serves to cooperate with memory disk 30 to index memory disk 30 appropriately to lock and unlock spool 16 at the appropriate positions. In the first preferred embodiment, control arm 50 is pivotally attached to cover 14 and includes a nose part 52 to ride in groove 34 of memory disk 30, to control the movement of control arm 50 between the inner and outer portions of groove 34. The sequence of events whereby memory disk 30 is appropriately indexed is illustrated in FIGS. 2-4: Beginning in an initial condition with control arm nose part 52 residing in shoulder 38 of groove 34, it will be noted that memory disk is locked at that angular position against further movement in the retractive direction, regardless of retractive movement of belt 18. Further extensive movement of belt 18 from this initial condition will cause memory disk 30 to rotate in the extractive direction, causing control arm nose part 52 to travel through the first transition region of groove 34 and up and over inclined ramp 35 to latch behind ledge 36. In the preferred embodiment illustrated, this angular position of memory disk 30 relative to control arm nose part 52 coincides with an alignment of detent 32 with locking pawl nose part 44. At this angular orientation of memory disk 30, both spool 16 and memory disk 30 are locked against further retractive movement, and the belt is in a tensionless condition (see FIG. 3). Further extensive movement of belt 18 causes extensive rotation of memory disk 30, bringing inclined ramp 33 into contact with locking pawl nose part 44, which urges locking pawl 40 out of engagement with ratchet disk 20, permitting smooth extractive and retractive movement of belt 18 above the slack position. So long as extractive movement of belt 18 does not cause memory disk 30 to rotate more than $2\pi$ radians from the initial condition, belt 18, and hence the wearer, will experience normal extractive and retractive forces within belt 18, and a substantial amount of extensive movement by the wearer is permitted, followed by a resumption of the tensionless position in belt 18 upon the wearer's resumption of his or her original position in the seat.

Upon extensive movements of belt 18 which result in extensive rotation of memory disk 30 in an amount greater than $2\pi$ radians from the initial condition, control arm nose part 52 will encounter notch 37 within groove 34, thus locking memory disk 30 against further extensive rotation with extensive movement of belt 18. Any slight retractive movement of belt 18 from this condition will result in follower arm nose part 52 being freed to return to the outer portion of groove 34 to reside against shoulder 38, thus preventing further retractive movement of memory disk 30 which, in turn, prevents pawl 40 from engaging ratchet disk 20 at retractive positions of belt 18 at, and below, the original tensionless position, thus restoring belt 18 to a tensioned mode.

In the first preferred embodiment, both locking pawl 40 and control arm 50 are pivoted about a single pivot point 60 on the underside of cover 14. A combination torsion and compression spring 62 biases locking pawl 40 towards ratchet disk 20 and also serves to bias control arm nose part 52 both in the radially-outward direction against the outer side of groove 34 and in a direction normal to the plane of memory disk 30, towards the bottom of groove 34 in memory disk 30.

Similarly, driver disk 26 and memory disk 30 are both rotatably mounted coaxially upon bearing shaft 63 extending from the inner surface of cover 14 (see FIG. 5) and memory disk 30 is biased toward driver disk 26 at the interface of friction clutch 29 by a bellville spring washer 64.

In order to activate and deactivate the tensionless mode in the first preferred embodiment, actuator cam 70 is provided having an outer periphery coincident with the outer periphery of the memory disk in a region adjacent to locking pawl nose part 44 which serves to retain locking pawl 40 in a disengaged position until the tensionless mode has been activated (see FIG. 2). This is achieved by a slight angular displacement of actuating cam 70 in the extensive direction (see arrow in FIG. 3), which brings detent 71 beneath locking pawl nose part 44, thereby freeing it for pivotal engagement into detent 32 upon the appropriate rotation of memory disk 30 (see FIGS. 3 and 4). Upon a subsequent retractive movement of actuator cam 70 in the retractive direction, locking pawl nose part 44 is either urged out of engagement with detent 32 or prevented from engagement therewith, thereby preventing locking of ratchet disk 20 against retractive movement, regardless of the position of memory disk 30.

In the first preferred embodiment, actuator cam 70 is provided with an overcenter latching pin 72 located on spring arm 74 to engage with an over-center latching recess 76 formed into the underside of cover 14. Upon application of an activating force to actuator arm 78 in the direction of the arrow shown in FIG. 3, latching pin 72 is urged over center within recess 76 and serves to retain actuator 70 in a tensionless-mode-engaged position.

In the first preferred embodiment illustrated in FIGS. 2, 3, and 4, the actuator 70 is engaged and disengaged by a stimulus external to the apparatus, namely, an electromechanical solenoid 80 which is energized and deenergized by a switch external to the apparatus. Thus, actuation/deactuation of the apparatus 10 into and out of a tensionless mode may be accomplished, e.g., by the step of buckling and unbuckling of belt 18 to the vehicle, but might as easily be arranged to coincide with the switching on or off of the ignition of the vehicle, or the step of shutting the doors of the vehicle. Similarly, a purely mechanical transducer, such as a push-pull wire within a conduit may be utilized to actuate the mechanism. Likewise, if it is desired to provide for manual engagement/disengagement of the mechanism, actuator arm 78 may be extended exterior to cover 14 to provide a gripping surface for the wearer to use in manually engaging and disengaging actuator cam 70.

The sequential operation of tension eliminator 10 is as follows: initially, when the passenger first enters the vehicle, belt 18 is in a fully-retracted position. Typically, control arm nose part 52 will reside against shoulder 38 in groove 34 of memory disk 30. During the buckling up sequence, belt 18 will be moved to a first extensive position, either by the passenger or, in some vehicles, the opening and closing of the vehicle's door. Regardless of the initial position of control arm nose part 52 in groove 34, the resulting movement of spool 16 in amounts of at least $k2\pi$ radians (where k is the drive reduction) will result in nose part 52 encountering notch 37, such that for further extensive movements of belt 18, memory disk 30 is locked against further extensive movement. Any slight retractive movement of belt 18 thereafter causes control arm nose part 52 to be urged into engagement with shoulder 38, and memory disk 30 is thus initially oriented for placing belt 18 into a tensionless mode, provided apparatus 10 has been actuated, either automatically or manually. If so, a subsequent extensive movement of belt 18 by a first predetermined amount, i.e., that amount corresponding to the relative angular displacement between memory disk 30 and control arm nose part 52 sufficient to cause nose part 52 to travel in groove 34 from within shoulder 38 to a position engaged behind ledge 36, also brings locking detent 32 into engagement with locking pawl nose part 44, thus locking ratchet disk 20 against further retractive movement. This results in belt 18 assuming a slack position. The amount of slack provided in belt 18 may be determined by the relationship $kr_1$ times the first predetermined amount of angular displacement of memory disk 30, where k is the ratio provided for in the reducer drive mechanism and $r_1$ is the mean radius of the belt 18 on spool 16 between the two relevant extensive positions of belt 18. In the first preferred embodiment illustrated, the amount of slack provided is about 25 millimeters.

Subsequent extensive movements of belt 18 less than a second predetermined amount, such as would be caused by the passenger leaning forward to adjust a control, for example, will result in normal extractive and retractive tension forces being exerted upon the passenger by belt 18 until the passenger resumes his or her initial position, at which point the slack position in belt 18 is resumed. This second pre-determined amount corresponds to the amount of "freedom" of movement of the passenger within the vehicle which does not cause the apparatus to become unlocked, i.e., to "forget" its tensionless position and resume a tensioned mode. However, in the event the wearer exceeds the second predetermined amount, which corresponds to a full revolution in the extensive direction of memory disk 30 from the initial position, this will result in control arm nose part 52 engaging notch 37, preventing further extensive movement of memory disk 30, such that for any slight subsequent retractive movement of belt 18, control arm nose part 52 returns to its initial engagement with shoulder 38, thus preventing subsequent retractive movement of memory disk 30 and, consequently, engagement of locking pawl 40 at the original slack position. The pre-determined amount of belt freedom available to the passenger is thus proportional to the amount of angular displacement available in the memory disk 30 above the slack position and is equal to $2\pi$ radians, minus the first predetermined amount. The amount of belt freedom is thus given by the relationship $kr_2$ times the second predetermined amount, where $r_2$ is the mean radius of belt 18 on spool 16 between positions of memory disk 30 corresponding to the slack position and the unlocking position. In the first preferred embodiment illustrated, the amount of belt freedom provided the passenger before unlocking of the tensionless mode occurs is about 300 millimeters of "memory."

A second exemplary preferred embodiment of the present invention is illustrated in FIGS. 8–13, with similar or corresponding elements enumerated with the same numbers as the first preferred embodiment, plus 100.

The second preferred embodiment differs from the first preferred embodiment in terms of the configuration of locking pawl 140, which is provided with a follower arm 143 upon which follower arm nose part 144 is located. Further, in the second preferred embodiment, memory disk 130 is urged against driver disk 126 by means of a coil spring 164, as opposed to the belleville washer spring 64 of the first embodiment. In the second embodiment, friction clutch 129 is provided for by means of a pair of beveled surfaces on the mating faces of driver disk 126 and memory disk 130, such that extractive and retractive frictional forces within the apparatus may be easily adjusted by simply changing the angle of the beveled surfaces only.

A second possible modification of tension eliminator 10 or 110 is in terms of the implementation of the reducer drive mechanism, illustrated in FIGS. 14–17, with numbering increased by 200.

In the second modification, the Geneva mechanism comprises a plurality of drive pins 222 on the face of locking reel 220 which engage a "star drive" mating configuration on the underside of driver disk 226. This drive mechanism results in the same reduction ratio, i.e., 3-to-1 as is illustrated in FIG. 7. Here, however, although the motion of driver disk 226 relative to movement of ratchet disk 220 is cyclical, there is no intermittancy, i.e., there are no relative positions of the two mating parts which result in a complete disengagement between the two parts, and hence, any "freewheeling" of driver disk 226 relative to ratchet disk 220 is prevented, without the necessity for the indexing pins 24 or 124 and indexing blocks 28 or 128 illustrated in the first modification.

By now, skilled practitioners will recognize that the amount of slack and extensive freedom in the belt available to the passenger are easily reduced or increased at the design stage by means of control over the driver reduction ratio k and the relationship of the first and second predetermined amounts of angular movement of the memory disk, the sum of which is $2\pi$ radians, as constrained by groove 34 or 134, respectively. From a practical standpoint, however, it is not desirable to provide a great deal of slack in the belt, since substantial amounts of slack may result in an unsafe condition. For this reason, as a practical matter, k will take on values in the range of between 1 and 4.

In either preferred embodiment, a majority of the components lend themselves well to inexpensive fabrication methods and materials, e.g., injection molded plastic parts. Thus, while it is intended that the parts be sufficiently rugged to withstand demanding use in service, they do not have to be fabricated with an eye towards the same fail-safe strength or rigidity of those components of the retractor mechanism which are designed to lock the mechanism against extractive movement during emergency conditions. Hence, the suggested materials, methods of manufacture, and configurations illustrated and described should be considered exemplary in nature and the spirit and scope of the present invention should be limited only in terms of the appended claims.

I claim:

1. In combination with a safety belt retractor mechanism of the type having a takeup reel normally rotationally biased in the retractive direction to wind the safety belt thereon to a belt-fully-retracted position, an apparatus for selectively relieving the rectractive tension in said belt, comprising:
    activating means associated with said apparatus, selectively engagable and disengagable, for activating said apparatus into or out of a belt-tensionless mode at any first extensive angular position of said reel $k2\pi$ radians greater than said fully-retracted position, where k is a predetermined constant $\geq 1$; and
    locking means associated with said reel and said activating means, operable when said apparatus is activated at said reel first angular position, otherwise inoperable, operatively responsive to an extensive angular displacement of said reel to a second angular position greater than said reel first angular position by a predetermined first amount, for locking said reel against retractive movement below said reel second angular position, and for permitting normal extensive and retractive movement of said reel between said reel second angular position and a third angular position of said reel greater than said reel second angular position by a predetermined second amount, being further operatively responsive to an extensive angular displacement of said reel beyond said reel third angular position, or to a selective disengagement of said activating means, for unlocking said reel to permit normal retractive movement thereof below said reel second angular position,
    wherein said predetermined first amount corresponds to the amount of slack in said belt in said tensionless mode and the sum of said predetermined first and second amounts is $k2\pi$ radians.

2. The apparatus of claim 1, wherein said locking mechanism further comprises:
    a ratchet wheel fixed to said reel for rotation therewith;
    a pawl, movably attached to said apparatus, movable between a position engaged with said ratchet wheel and a position disengaged therefrom, for respective locking and unlocking of said reel against said retractive movement below said second angular position, said pawl being locked into said pawl disengaged position and released therefrom by disengagment or engagement of said activating means, respectively; and
    pawl controlling means for urging said pawl to said pawl engaged and disengaged positions, further including means for detecting reel angular displacement and controlling said pawl movement in response thereto.

3. The apparatus of claim 2, wherein said pawl controlling means further comprises:
    biasing means for urging said pawl into said pawl engaged position;
    a follower arm, having a nose part thereon, attached to said pawl for moving said pawl between said pawl engaged and disengaged positions;
    a cam, rotatably-attached to said apparatus and coupled to said reel for co-rotation therewith, said cam being programmed to cooperate with said follower arm and said pawl biasing means to urge said pawl into said pawl engaged position at a predetermined first angular orientation of said cam, whereby said reel and said cam are locked against further retractive movement, and to urge said pawl into said disengaged position by extensive angular displacements of said cam greater than said cam first angular orientation and slightly less than $2\pi$ radians; and
    orienting means for orienting said cam relative to said follower and said reel, further including clutching means for coupling and uncoupling said cam rotatably to said reel, such that, for extensive movements of said reel from below said reel first and third angular positions, said cam is fixed against extensive movement at a cam second angular orientation less than said cam first angular orientation by $1/k$ times said reel first predetermined amount, and for retractive movements of said reel from above said reel third angular position, said cam is fixed against retractive movement below said cam second angular orientation.

4. The apparatus of claim 3, wherein said cam orienting means further comprises:
    a control arm, movably attached to said apparatus for movement between a first and a second position of engagement with said cam, said control arm cooperating with said cam to prevent cam retractive movement below said cam second angular orientation when said arm is in said arm first position and to prevent cam extensive movement beyond a third angular orientation of said cam greater than said cam first angular orientation by 1/k times said reel second predetermined amount when said arm is in said second position, wherein the total angular displacement of said cam between said cam second angular orientation and said cam third angular orientation is slightly greater than $2\pi$ radians;

first control arm biasing means for biasing said control arm toward said control arm first position; and wherein said cam is further programmed to cooperate with said arm biasing means to urge said control arm from said first position to said second position upon extensive movement of said cam beyond said cam second angular orientation and to release said arm to said first position upon retractive movement of said cam to a position slightly below said cam third angular orientation.

5. The apparatus of claim 4, further comprising:

second control arm biasing means to bias said arm towards said cam in a direction parallel to said cam rotational axis; and said cam having an inclined ramp upon a surface of said cam normal to said cam rotational axis in the extractive direction, said ramp being followed by a ledge in said direction, said ramp and said ledge being disposed upon said surface to engage and cooperate with said control arm and said second control arm biasing means to permit extensive movement of said cam between said cam second angular orientation and said cam first angular orientation and to prevent retractive movement of said cam below said cam first angular orientation.

6. The apparatus of claim 5, further comprising:

a friction clutch to couple rotational movement of said reel to said cam when said cam is permitted to rotate by said control arm and to permit relative rotational slipping therebetween otherwise; and driving means for driving said cam through said clutch with said reel.

7. The apparatus of claim 6, wherein said driving means further comprises:

reducing means for rotatably coupling said cam to said reel and for driving said cam with said reel at a reduced ratio such that k turns of said reel result in one turn of said cam.

8. The apparatus of claim 7, wherein said reducing means further comprises:

a gear drive.

9. The apparatus of claim 7, wherein said reducing means further comprises:

a geneva mechanism.

10. The apparatus of claim 9, wherein:

said drive ratio is 3-to-1, said reel first predetermined amount is about 1.4 radians and said reel second predetermined amount is about 17.4 radians.

11. The apparatus of claim 7, wherein said activating means further comprises:

operating means for selectively urging said pawl into said pawl disengaged position, operatively responsive to stimuli external of said apparatus.

12. The apparatus of claim 11, wherein said operating means further comprises:

means for retaining said pawl in said pawl-disengaged position, further including means for releasing said pawl from said retained, disengaged position, operatively responsive to said external stimuli.

13. The apparatus of claim 11 wherein said operating means further comprises:

a second cam, movably-attached to said apparatus, operatively responsive to said external stimuli to move between a first and a second position, programmed to cooperate with said pawl follower arm nose part to urge said pawl into said pawl disengaged position and to release said pawl therefrom upon movement between said first and a second positions, respectively.

14. The apparatus of claim 13, wherein said external stimuli is provided by manual operation of said second cam.

15. The apparatus of claim 13, wherein said external stimuli is provided automatically by a mechanical transducer.

16. The apparatus of claim 13, wherein said external stimuli is provided automatically by an electromechanical solenoid.

17. The apparatus of claim 11, wherein said operating means further includes an activating arm attached to said pawl and extending exteriorly of said apparatus for urging said pawl into said disengaged position, responsive to movement thereof by said external stimuli.

18. For restraining a passenger within a vehicle, a safety belt retractor mechanism having a selectively-engagable tensionless mode, comprising:

a frame attached to said vehicle;

a flexible safety belt;

a spool, rotatably-journeled in said frame, having one end of said belt attached thereto, for winding said belt radially thereon;

a spring, attached between said spool and said frame, for continuously biasing said spool in a belt-retractive direction and against a belt-extensive direction, to wind said belt toward a fully-retracted belt position;

buckling means for buckling the other end of said belt to said vehicle about said passenger at a first extensive position of said belt at least $k2\pi r_1$ longer than said fully-retracted belt position, where k is a predetermined constant $\geq 1$ and $r_1$ is the mean radius of said belt on said spool between said fully-retracted belt position and said first extensive belt position;

first locking means attached to said frame, operatively-responsive to accelerations of said vehicle and/or said spool of a level corresponding to those encountered during emergency conditions, to lock said belt against further extensive movement, whereby said belt serves to restrain said passenger in said vehicle during said emergency conditions;

selector means for selecting between a tensioned mode and a tensionless mode in said mechanism, operatively-responsive to manual activation/deactivation by said passenger by the step of buckling said belt up at, or beyond, said first extensive belt position;

second locking means attached to said frame, operable when said belt is in said tensionless mode, otherwise inoperable, engagable to lock said belt against further retractive movement and to permit normal extractive movement of said belt therebeyond;

measuring means for measuring movement of said belt relative to a given belt position, further including means for detecting an extensive displacement of said belt to a second belt position longer than said given position by a first predetermined amount and for engaging said second locking means thereat, further including means for detecting an extensive displacement of said belt to a third belt position longer than said second belt position by a second predetermined amount and for disengaging said second locking means thereat;

indexing means for setting said given belt position equal to said first extensive belt position; and wherein the sum of said first and second predetermined amounts is $k2\pi r_2$, where $r_2$ is the mean radius of said belt on said spool between said first and third belt positions.

19. The mechanism of claim 18, wherein:

said measuring means further includes means for deactivating said selector means upon said extensive movement of said belt to said belt third position and for retaining said selector means in said condition until manually reactivated by said passenger.

20. The apparatus of claim 18, wherein said measuring means further comprises:

a cam rotatably-coupled to said spool for corotation therewith and programmed to cooperate with said second locking means to operate said locking means to lock said belt at an angular position of said spool corresponding to said belt second position and to operate said second locking means to unlock said belt otherwise; and a Geneva mechanism for coupling said cam to said spool for co-rotation therewith and for driving said cam with said spool at a reduced rate of $1/k$.

* * * * *